(12) United States Patent
Talafa (10) Patent No.: US 9,524,204 B2
(45) Date of Patent: Dec. 20, 2016

(54) METHODS AND APPARATUS FOR CUSTOMIZING AND USING A REUSABLE DATABASE FRAMEWORK FOR FAULT PROCESSING APPLICATIONS

(71) Applicant: HONEYWELL INTERNATIONAL INC., Morristown, NJ (US)

(72) Inventor: Martin Talafa, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 139 days.

(21) Appl. No.: 14/506,347

(22) Filed: Oct. 3, 2014

(65) Prior Publication Data
US 2016/0098314 A1    Apr. 7, 2016

(51) Int. Cl.
G06F 11/07    (2006.01)
G05B 23/02    (2006.01)

(52) U.S. Cl.
CPC ....... G06F 11/0787 (2013.01); G05B 23/0275 (2013.01); G06F 11/079 (2013.01); G06F 11/0739 (2013.01); G06F 11/0751 (2013.01)

(58) Field of Classification Search
CPC . G06F 11/0751; G06F 11/079; G06F 11/0739; G06F 11/0787; G06F 9/455
See application file for complete search history.

(56) References Cited

U.S. PATENT DOCUMENTS

| | | | |
|---|---|---|---|
| 4,977,390 A | 12/1990 | Saylor et al. | |
| 7,958,076 B2 * | 6/2011 | Bergsten | G06N 5/025 706/47 |
| 8,306,931 B1 * | 11/2012 | Bowman | G06N 3/0454 706/20 |
| 8,378,853 B2 * | 2/2013 | Smith | G06F 11/0739 340/945 |
| 2004/0187048 A1 * | 9/2004 | Angamuthu | G06F 11/0727 714/27 |
| 2014/0310291 A1 * | 10/2014 | Huang | G06F 17/2705 707/755 |

OTHER PUBLICATIONS

Access Intelligence; 727 to 787: Evolution of Aircraft Maintenance Systems, Special Report, Aviation Maintenance, 2005.
Johnson, S.B. et al.; System Health Management: with Aerospace Applications; John Wiley & Sons, 2011.
Extended EP search report for Application No. 15188028.3-1951 dated Feb. 15, 2016.

* cited by examiner

Primary Examiner — Nadeem Iqbal
(74) Attorney, Agent, or Firm — Lorenz & Kopf, LLP (57) ABSTRACT

A method for operation of a reusable fault processing database in conjunction with a complex system is provided. The method stores a set of logical rules into one or more logic entities of the reusable fault processing database, the set comprising one or more executable instructions applicable to fault detection and fault isolation in the complex system; stores at least one defined variable for each of the received set of logical rules, the at least one defined variable being stored into one or more variable entities of the reusable fault processing database; and stores a configuration of at least one external interface of the reusable fault processing database, the configuration being stored in one or more input/output (I/O) entities of the reusable fault processing database, the external interface comprising a defined set of input to the reusable fault processing database and a defined set of output from the reusable fault processing database.

17 Claims, 5 Drawing Sheets

METHODS AND APPARATUS FOR CUSTOMIZING AND USING A REUSABLE DATABASE FRAMEWORK FOR FAULT PROCESSING APPLICATIONS

TECHNICAL FIELD

Embodiments of the subject matter described herein relate generally to customizing and using a fault processing database. More particularly, embodiments of the subject matter relate to a reusable database framework used for developing a customized fault isolation database for multiple complex systems.

BACKGROUND

Fault processing is an essential part of the aircraft health management system. It provides means of detection, isolation, display, and storage of faults and correlation of these faults with associated Engine Indicating and Crew Alerting System (EICAS) messages. The purpose of fault isolation in complex systems is to narrow the location of a fault to a single line replaceable unit (LRU), or a group of LRUs. This provides a mechanism to identify a failed component within a system and to minimize time spent to repair the problem. Fault isolation logic may be subject to frequent changes during the life cycle of a system, based on service experience or system upgrades.

Accordingly, it is desirable to provide fault isolation logic that is easily modifiable for use by multiple complex systems and/or projects. In addition, it is desirable to provide fault isolation logic that is designed in a manner to allow its certification separately from the system software to decrease certification complexity and cost. Furthermore, other desirable features and characteristics will become apparent from the subsequent detailed description and the appended claims, taken in conjunction with the accompanying drawings and the foregoing technical field and background.

BRIEF SUMMARY

Some embodiments provide a method for operation of a reusable fault processing database in conjunction with a complex system. The method stores a set of logical rules into one or more logic entities of the reusable fault processing database, the set comprising one or more executable instructions applicable to fault detection and fault isolation in the complex system; stores at least one defined variable for each of the received set of logical rules, the at least one defined variable being stored into one or more variable entities of the reusable fault processing database; and stores a configuration of at least one external interface of the reusable fault processing database, the configuration being stored in one or more input/output (I/O) entities of the reusable fault processing database, the external interface comprising a defined set of input to the reusable fault processing database and a defined set of output from the reusable fault processing database.

Some embodiments provide a reusable fault processing system. The reusable fault processing system includes a fault processing module, configured to initiate execution of a set of reconfigurable logical rules associated with fault detection and fault isolation in a complex system; and a fault detection database module, configured to provide a framework for customization and use of the reusable fault processing system, the fault detection database module comprising: a plurality of logic entities, configured to store the set of reconfigurable logical rules; a plurality of variable entities, configured to store definitions for a plurality of variables for use by the at least one logic entity; and at least one input/output (I/O) entity, configured to store a definition for at least one connection within the complex system and external to the fault detection database module.

Some embodiments provide a computer-based fault processing system comprising a non-transitory, computer-readable medium containing instructions thereon, which, when executed by a processor, define a reusable database structure. The reusable database structure includes a first framework for a set of executable logical rules, the set of executable logical rules configured for execution by the computer-based fault processing system, the set of executable logical rules configured to detect and isolate a fault in a complex system of line-replaceable units (LRUs); a second framework for a plurality of variables, the plurality of variables configured to: specify one or more input values to each of the set of executable logical rules; and specify one or more output values from each of the set of executable logical rules; and a third framework for an external interface, the external interface configured to define at least one connection between the reusable database structure and the complex system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for customizing and using a reusable fault processing database framework in conjunction with a complex system. More specifically, the subject matter relates to a framework for the configuration (and potential re-configurations) of logical rules, variables applicable to the logical rules, and input and output connections to the database. This reusable framework is stored in the database and may be customized according to the fault processing requirements of a particular complex system. Once configured for a particular complex system, one or more fault processing tasks may be executed and use the reusable fault processing database for fault detection and isolation in the complex system.

Figure 1:
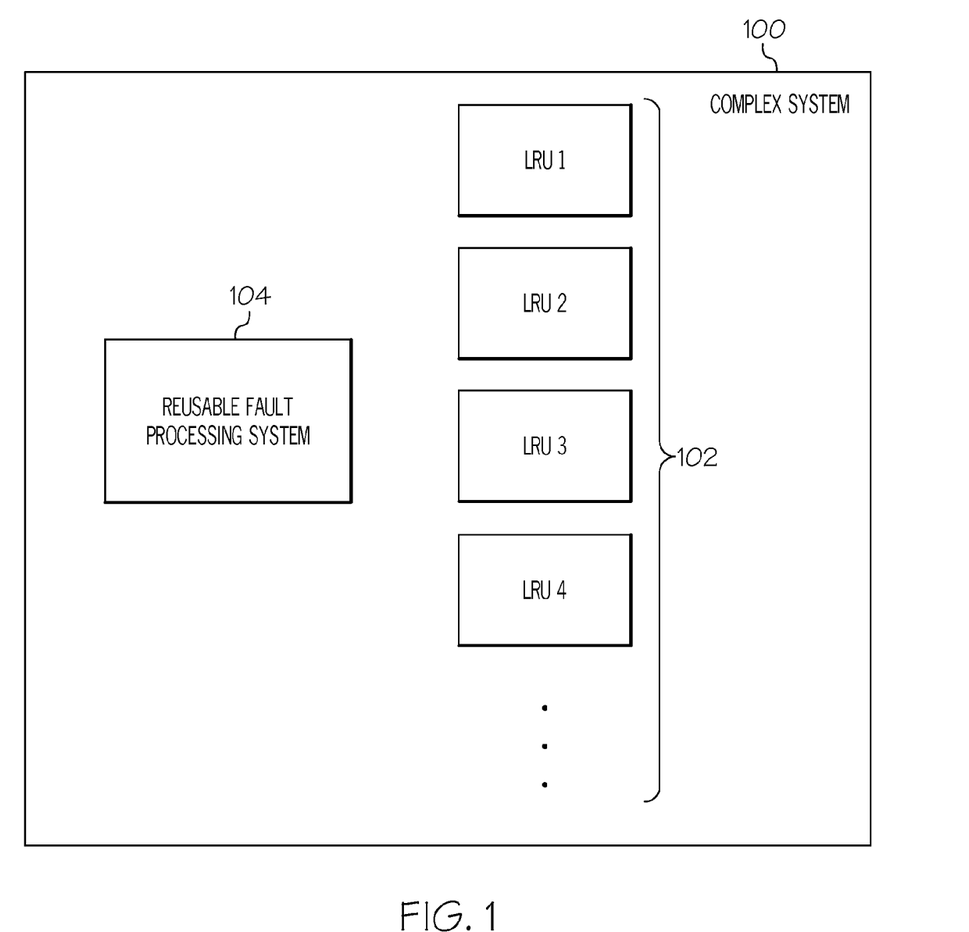
FIG. 1 is a schematic representation of an embodiment of a complex system.

Turning now to the figures, FIG. 1 is a schematic representation of an embodiment of a complex system 100. As shown, the complex system 100 may include, without limitation, a reusable fault processing system 104 and a plurality of line replaceable units (LRUs) 102. A complex system may be defined as an interconnected system including multiple LRUs 102, each LRU 102 capable of communication with the other LRUs 102 of the complex system 100, wherein the collection of interconnected LRUs 102 operate in furtherance of a defined function of the complex system 100. Exemplary embodiments of a complex system 100 may include, without limitation: computing systems, flight controls systems, automotive systems, or the like. LRUs 102 of a complex system 100 may include any hardware component capable of communication. In certain embodiments, LRUs 102 may include more sophisticated components, including microcontrollers, microprocessors or other computer-based parts. In some embodiments, LRUs 102 may include simpler components, such as a switch.

A reusable fault processing system 104 is a customizable mechanism used to perform fault processing tasks for the complex system 100. A fault may be defined as an error or failure in at least one part of a complex system 100, such as an LRU 102. The reusable fault processing system 104 uses fault processing techniques to determine when a fault has occurred (e.g., fault detection), and to determine the individual unit, or LRU 102, of the complex system 100 at which the fault occurred (e.g., fault isolation). In the context of this application, the term "fault processing" may include the detection and/or isolation of one or more faults within the complex system 100. An exemplary embodiment of the complex system 100 may be a flight controls system of a civil aircraft composed of multiple LRUs 102. In this embodiment, examples of LRUs 102 may include, without limitation: flight controls modules acting as central units to provide complex computation capabilities, actuation control units performing direct control of aircraft actuation system, and other supporting units providing data from various aircraft sensors. In this exemplary embodiment, the reusable fault processing system 104 would be embedded in flight controls modules which monitor status of other LRUs 102 of the flight controls system and provide isolated fault information to onboard health management system by processing data from the fault processing system 104.

Figure 2:
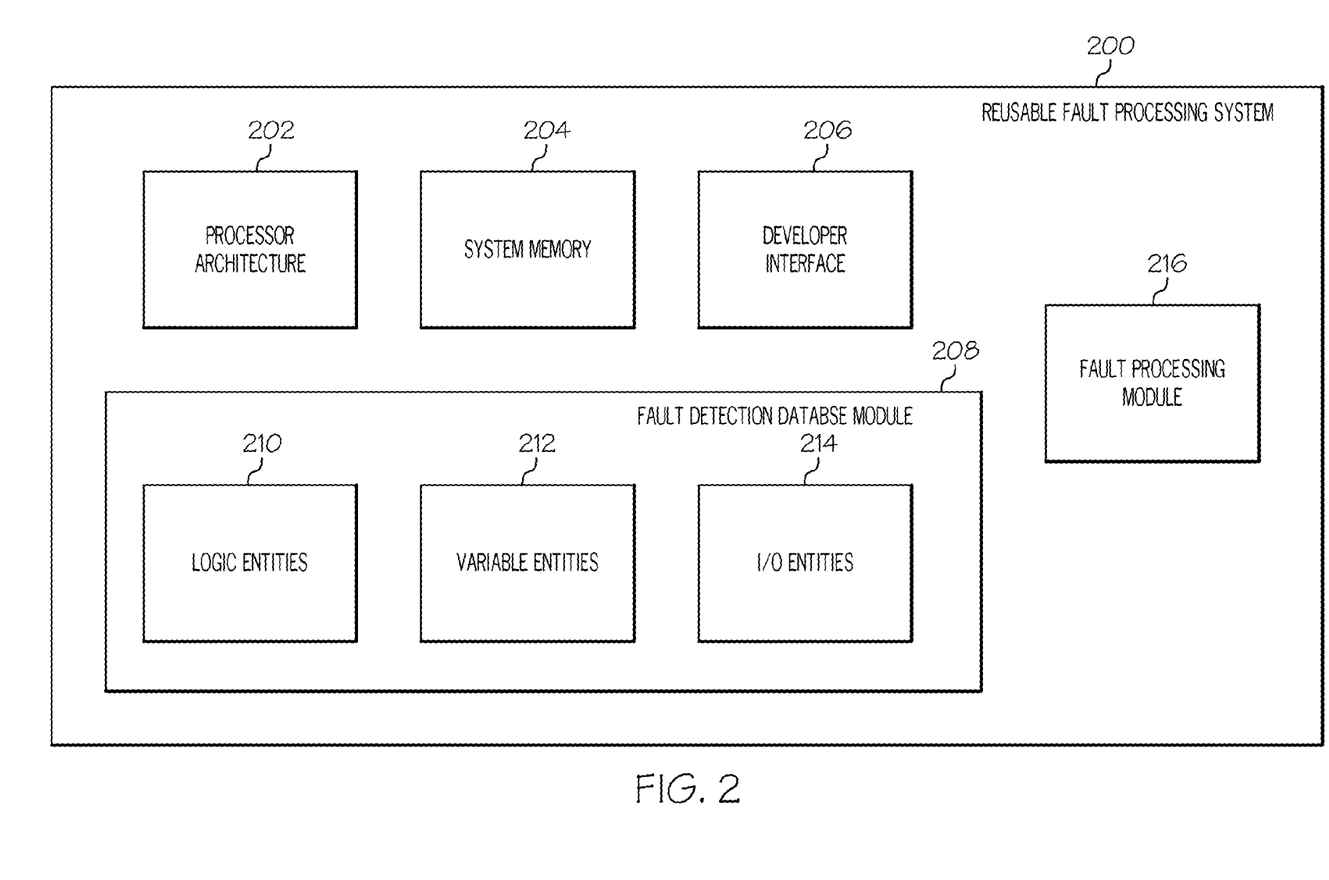
FIG. 2 is a schematic block diagram representation of a reusable fault processing system for use in conjunction with a complex system, according to some embodiments.

FIG. 2 is a schematic block diagram representation of a reusable fault processing system 200 for use in conjunction with a complex system, according to some embodiments. It should be appreciated that the reusable fault processing system 200 illustrates one embodiment of the reusable fault processing system of FIG. 1 (see reference 104), including additional detail. The reusable fault processing system 200 may be implemented using any desired platform. For example, the reusable fault processing system 200 could be realized as any of the following, without limitation: a desktop computer, a laptop computer, a server system, a mobile device, a specialized piece of diagnostic equipment, or any other device that includes a processor architecture 202.

The reusable fault processing system 200 may include, without limitation: a processor architecture 202, a system memory 204, a developer interface 206, a fault detection database module 208 (including one or more logic entities 210, variable entities 212, and input/output (I/O) entities 214), and a fault processing module 216. In practice, an embodiment of the reusable fault processing system 200 may include additional or alternative elements and components, as desired for the particular application. For example, additional components such as displays and user input components may be employed without departing from the scope of the present disclosure. For ease of illustration and clarity, the various physical, electrical, and logical couplings and interconnections for these elements and features are not depicted in FIG. 2. Moreover, it should be appreciated that embodiments of the reusable fault processing system 200 will include other elements, modules, and features that cooperate to support the desired functionality. For simplicity, FIG. 2 only depicts certain elements that relate to the schematic element mapping techniques described in more detail below.

The processor architecture 202 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems.

The processor architecture 202 is in communication with system memory 204. The system memory 204 represents any non-transitory short or long term storage or other computer-readable media capable of storing programming instructions for execution on the processor architecture 202, including any sort of random access memory (RAM), read only memory (ROM), flash memory, magnetic or optical mass storage, and/or the like. It should be noted that the system memory 204 represents one suitable implementation of such computer-readable media, and alternatively or additionally, the processor architecture 202 could receive and cooperate with external computer-readable media that is realized as a portable or mobile component or application platform, e.g., a portable hard drive, a USB flash drive, an optical disc, or the like.

The developer interface 206 is operatively associated with the processor architecture 202. The developer interface 206 is implemented using hardware capable of transmitting user input into the reusable fault processing system 200, to include without limitation: a computer keyboard, mouse, touch-pad, and/or trackball and screen; a touch-screen device; a voice recognition interface; or the like. The developer interface 206 may be used to receive input associated with configuration (or modification) and storage of fault processing parameters in a fault detection database module 208. These fault processing parameters may include, without limitation: a set of logical rules, a plurality of variables, an external interface (including external connections), and/or an order of execution for the set of logical rules. The developer interface 206 may also be used to receive input associated with modifying and/or executing instructions associated with fault processing, such as those stored in the fault processing module 216. In this situation, receiving user input to modify fault processing instructions does not alter a current configuration of the fault processing parameters currently stored at the fault detection database module 208. Similarly, receiving user input to modify fault processing parameters does not alter a current configuration of stored fault processing instructions.

The fault detection database module 208 is suitably configured to provide a framework, or in other words, a place for the storage and extraction of modifiable fault processing parameters that are applicable to a particular complex system. Modifiable fault processing parameters may include logical rules in the form of executable instructions applicable to fault processing, defined variables for each of the logical rules, a sequence for proper execution of the logical rules, and a configuration of input and output signals to the fault detection database module 208. It should be appreciated that other embodiments of a fault detection database module 208 may include additional parts to the framework, potentially providing one or more storage and extraction places for additional fault processing parameters not described here, without diminishing the core functionality of the framework described herein.

In certain embodiments, the framework provided by the fault detection database module 208 may be divided into categories associated with distinct types of fault processing parameters. For example, the framework may include logic entities 210 for housing logical rules and an execution order of the logical rules, variable entities 212 for housing defined variables applicable to the logical rules, and input/output (I/O) entities 214 for housing a configuration of input signals to, and output signals from, the fault detection database module 208. The fault detection database module 208 is configured to receive user input data and/or system-stored data in the form of logical rules, variable definitions, configurations of an execution order, I/O signals, and the like, via communication with the developer interface 206, the system memory 204, or both.

One or more logic entities 210 provide a framework for storing logical rules. Logical rules may be defined as executable instructions utilized to generate a fault processing result in a particular complex system. Generally, the logical rules are defined by a user (e.g., a system developer or fault processing analyst), and may vary based on the particular complex system to which the logical rules are applicable. In certain embodiments, each of the logical rules comprise a truth table, a latch, a debounce, or the like. Logic entities 210 may be defined as a framework, a "blank" space, or an "empty" location, suitable for storage of the received logical rules. Although executable, the logical rules remain dormant until called by a function. In certain embodiments, logical rules are retrieved and executed by a function originating at the fault processing module 216, which is external to the fault detection database module 208.

The logic entities 210 are configured to store the number of logical rules applicable to fault processing for the particular complex system. The number of logical rules is determined by the requirements of the complex system. The logic entities 210 additionally provide a framework for storage and retrieval of an execution order, which may be defined as a sequence for execution of the logical rules.

The logic entities 210 may further be configured to include logic sub-entities (not shown in FIG. 2), which provide a framework for divided portions of logical rules, or in other words, logical "sub-rules". In one example, a logical rule may include a truth table, which may be divided into multiple truth vectors. The truth table may be stored into a logic entity 210, while each component truth vector of the truth table may be stored into logic sub-entities. An exemplary embodiment of logic entities 210 and logic sub-entities is described with regard to FIG. 3, including additional detail.

The variable entities 212 provide a framework suitable for storage of defined variables applicable to the logical rules. Variables may be defined as input or output signals of logic entity 210 representing a logical rule. The input variables are used to calculate the logic entity state which is explicitly represented by the corresponding output variables. In certain embodiments, one or more of the definitions for the plurality of variables comprises a signal originating outside of the fault detection database module 208. In some embodiments, one or more of the definitions for the plurality of variables comprises an output of a first one of the set of logical rules (which are stored in the logic entities 210) and an input to a second one of the set of logical rules. More specifically, an output result of one particular logical rule may be forwarded as a required input value for an operation performed by another logical rule.

The I/O entities 214, like the logic entities 210 and the variable entities 212, provide a framework for the storage of a configuration of an external interface to the fault detection database module 208. In certain embodiments, the I/O entities 214 are represented by one or more tables, and the external interface may be defined as any connection to the complex system located outside of the fault detection database module 208. Detail related to this connection, including an applicable communication protocol for the complex system or functional parts within the system, storage of fault information to the system ROM, and communication with the fault processing module 216 may be included in the configuration data for the external interface. In certain embodiments, the definition for at least one connection comprises a table applicable for use with a plurality of communication protocols. An exemplary embodiment of data provided by I/O entities 201 may include bit positions of specific input or output variables of the fault detection database module 208 in external data buffers used to communicate with other modules or system units.

The fault processing module 216 is configured to provide one or more executable functions which are stored and executed from a location external to the fault detection database module 208. Alterations to the one or more functions of the fault processing module 216 are completed outside of the structure of the fault detection database module 208, and do not alter the fault processing parameters stored in the fault detection database module 208. Similarly, modifications to the parameters stored in the fault detection database module 208 do not affect the executable functions provided by the fault processing module 216. In certain embodiments, an executable function provided by the fault processing module 216 is utilized as a "main" fault processing function for the reusable fault processing system 200. In this capacity, the main function executes, or initiates execution of, the logical rules stored in the logic entities 210 of the fault detection database module 208, in addition to performing other fault processing operations and/or steps applicable to the particular complex system (e.g., fault detection and fault isolation tasks). The main function accesses the contents of the logic entities 210, the variable entities 212, and the I/O entities 214 through the use of one or more function calls.

In practice, the fault detection database module 208 and/or the fault processing module 216 may be implemented with (or cooperate with) the processor architecture 202 to perform at least some of the functions and operations described in more detail herein. In this regard, the fault detection database module 208 and/or the fault processing module 216 may be realized as suitably written processing logic, application program code, or the like.

Figure 3:
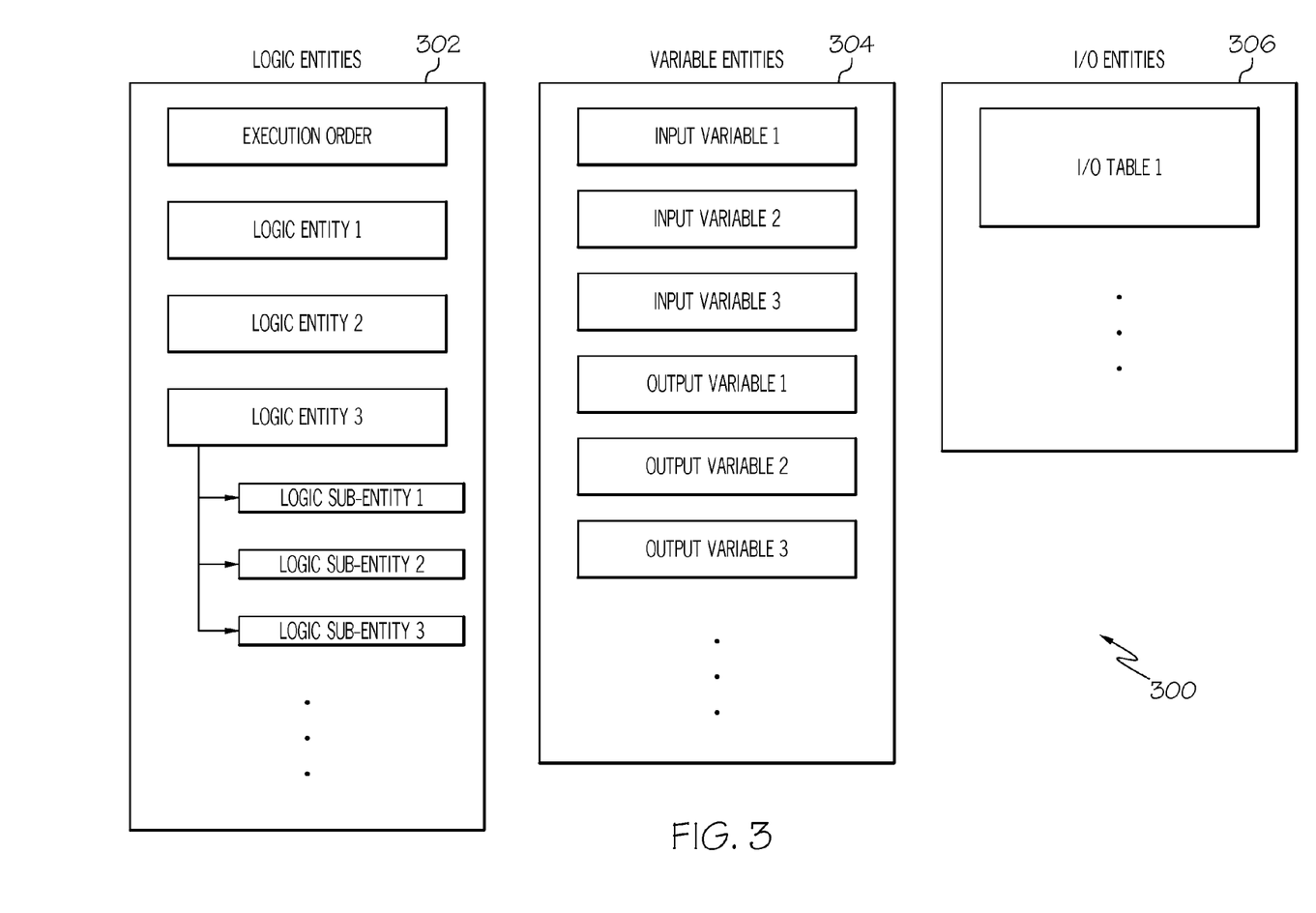
FIG. 3 is a schematic diagram representation of a reusable fault processing database framework, according to some embodiments.

FIG. 3 is a schematic diagram representation of a reusable fault processing database framework 300, according to some embodiments. It should be appreciated that FIG. 3 depicts a simplified embodiment of the fault detection database module (see reference 208 of FIG. 2), and that a realistic and practical implementation of the fault detection database module may include additional elements or components. As shown, the reusable fault processing database framework 300 may be divided into logic entities 302, variable entities 304, and I/O entities 306. Each of these provide a housing or structure for storage of distinct, customizable fault processing parameters applicable to a particular complex system. One particular complex system may require storage and use of a set of fault processing parameters that are distinct from the set of fault processing parameters used for another complex system, and the reusable fault processing database framework 300 provides a customizable data structure for use with each complex system.

Each of the divisions shown may be sub-divided into more specific structures for the storage of each individual parameter. In this particular embodiment, the logic entities 302 is sub-divided into an execution order, logic entity 1, logic entity 2, and logic entity 3. Here, the execution order is configured to receive and store a sequence of execution for each of a set of logical rules, and each of logic entity 1, logic entity 2, and logic entity 3 are configured to receive and store a single logical rule. In this particular embodiment, logic entity 3 is further divided into logic sub-entity 1, logic sub-entity 2, and logic sub-entity 3. This particular configuration is useful for logic entities that may include a larger logical rule which is a combination of multiple component rules. For example, logic entity 3 may be configured to store a truth table that includes three truth vectors. Logic sub-entity 1 may be configured to store a first truth vector, logic sub-entity 2 may be configured to store a second truth vector, and logic sub-entity 3 may be configured to store a third truth vector.

In this embodiment, the variable entities 304 are sub-divided into framework sections for input variables 1-3 and output variables 1-3. Each of the framework sections for input variables 1-3 may be used to store definitions for signals inputting a corresponding logical rule, which are applicable to and used in execution of one or more of logic entities 1-3. Each of the framework sections for output variables 1-3 may be used to define signals produced by a logical rule, which are also applicable to one or more of logic entities 1-3. In this exemplary embodiment, the I/O entities 306 include I/O table 1. It should be appreciated that other embodiments may include additional I/O tables, depending on the requirements of the complex system for which the reusable fault processing database framework 300 is being used.

The variable entities 304 represent values internal to the fault detection database module 208. These values may define variables acting as inputs to a logical rule from an external system, variables internal to the database produced from a logical rule and inputting another logical rule or variables representing outputs the fault detection database module 208. Connection of input or output variable entities outside the fault detection database module 208 is realized through I/O entities 306 which provide link definitions to source or destination signals outside the fault detection database module 208.

As indicated by the ellipses ( . . . ) for each of the logical entities 302, the variable entities 304, and the I/O entities 306, additional sub-divisions (and/or further divisions of the sub-divisions) of each may be used, depending on the requirements of a complex system or the embodiment of the reusable fault processing database framework 300.

Figure 4:
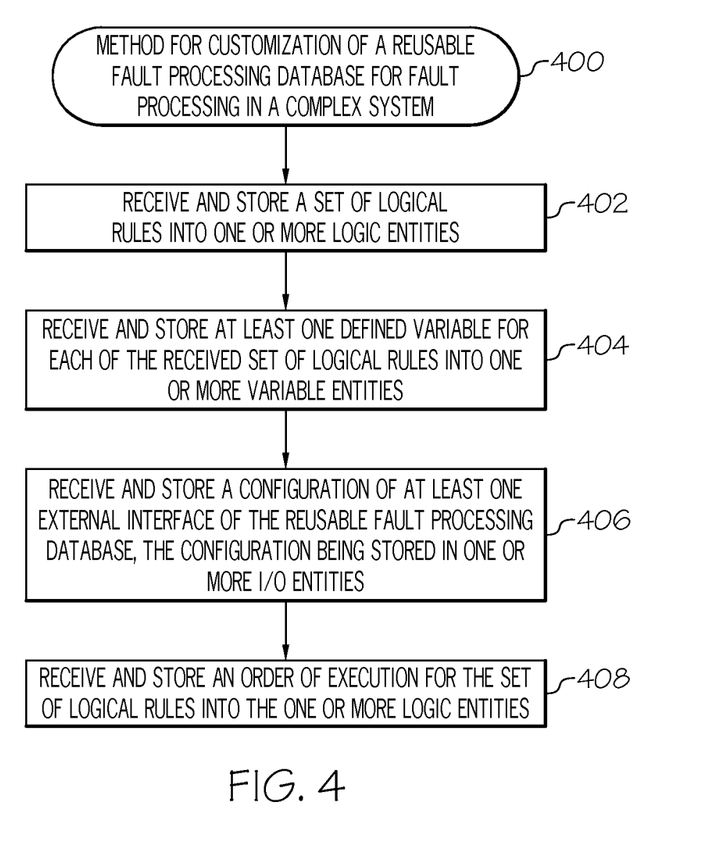
FIG. 4 is a flow chart that illustrates an embodiment of a process for customizing a reusable fault processing database for fault processing in a complex system.

FIG. 4 is a flow chart that illustrates an embodiment of a process 400 for customizing a reusable fault processing database for fault processing in a complex system. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., the developer interface; the logic entities, variable entities, and/or I/O entities of the fault detection database module; and/or the fault processing module of the reusable fault processing system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, it is assumed that process 400 begins by receiving and storing a set of logical rules into one or more logic entities, each of the set comprising one or more executable instructions applicable to fault detection in the complex system (step 402). Next, the process 400 receives and stores at least one defined variable for each of the received set of logical rules, the at least one defined variable being stored into one or more variable entities (step 404).

The process 400 then receives and stores a configuration of at least one external interface of the reusable fault processing database, the configuration being stored in one or more input/output (I/O) entities, the external interface comprising a defined set of input to the reusable fault processing database and a defined set of output from the reusable fault processing database (step 406). Generally, the defined set of input comprises communication signals received by the process 400 to indicate the existence or location of a fault in the complex system. The configuration of the at least one external interface defines the units of the complex system from which these input signals are received. The configuration further defines the form and content of output generated by the execution of the set of logical rules stored in the logic entities. In certain embodiments, the defined set of output comprises a fault report, which further comprises fault detection data and fault isolation data for the complex system.

Next, the process 400 receives and stores an order of execution for the set of logical rules into the one or more logic entities, the order of execution comprising a fixed execution sequence for each of the executable instructions (step 408). The logical rules (i.e., executable instructions for the performance of fault processing techniques) are executed in a particular sequence to obtain accurate fault processing output. The order of execution stored in the logic entities is accessed and retrieved for use when necessary for performance of fault processing tasks.

Data received and stored in the framework of the reusable fault processing database (including the set of logical rules, the at least one defined variable, the configuration of at least one external interface, and the execution order) may be received from a user (typically via user input device) or extracted from a location in system memory. This data may be sent, or "pushed," to the database according to a time-based or an event-based schedule. In certain embodiments, data may be sent to the database periodically (e.g., every hour), based on the contents of user input and/or the contents of a predefined memory location. In some embodiments, data may be sent to the database upon the occurrence of data being received at a user interface, upon the occurrence of a change of data at a particular memory location, or upon the occurrence of another predefined event. Further, data may be sent once requested by the database. Such requests may also be made according to a time-based schedule, or upon the occurrence of a predefined event, such as upon startup of the system.

In certain embodiments, the process 400 may receive and store a second set of logical rules and a second order of execution into the one or more logic entities, wherein storing the second set of logical rules and the second order of execution effectively overwrites the first set of logical rules and the first order of execution. In addition, a second at least one variable may be received and stored to overwrite the first at least one variable, and a second configuration for an external interface may be received and stored to overwrite the first configuration. Each of these fault processing parameters may be defined and re-defined, as required to perform fault processing for a particular complex system. In this manner, the fault processing parameters received by, and stored in, the reusable fault processing database may be reconfigured as needed. Here, the second set of logical rules may be executed, according to the second order of execution, to produce a second result. Stored fault processing parameters may be configured and reconfigured without altering other aspects of the complex system, including an executable fault processing function which may utilize a function call to initiate execution of the logical rules.

Data received by the reusable fault processing database is stored in the one or more logic entities, variable entities, or I/O entities until overwritten or removed. Once stored, this data is extractable for use and/or modifiable from this location in the framework.

Figure 5:
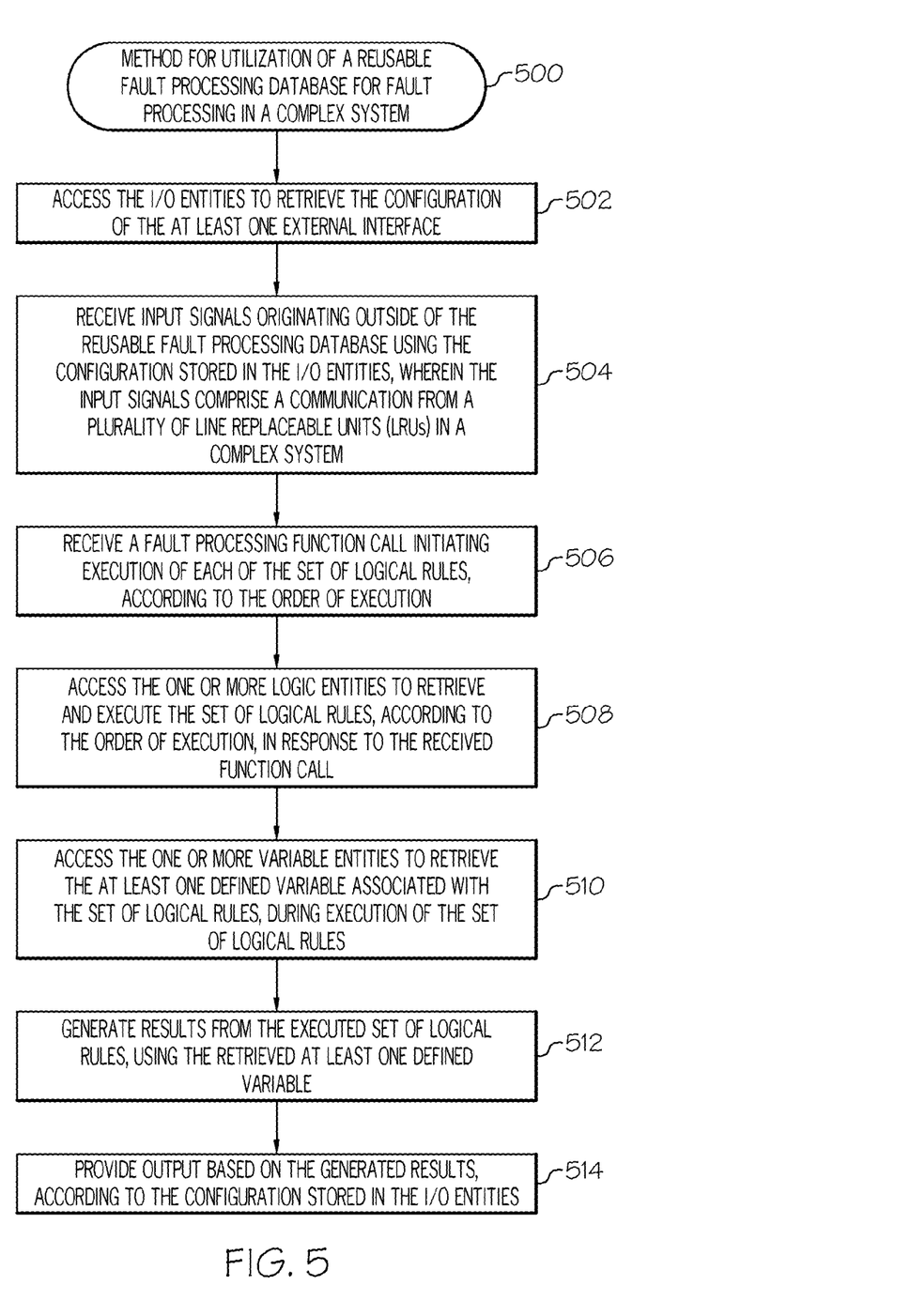
FIG. 5 is a flow chart that illustrates an embodiment of a process for utilization of a reusable fault processing database for fault processing in a complex system.

FIG. 5 is a flow chart that illustrates an embodiment of a process 500 for utilization of a reusable fault processing database for fault processing in a complex system. First, the process 500 accesses the I/O entities to retrieve the stored configuration of the at least one external interface (step 502).

Next, the process 500 receives input signals originating outside of the reusable fault processing database using the configuration stored in the I/O entities, wherein the input signals comprise a communication from a plurality of line replaceable units (LRUs) in a complex system (step 504). For example, the input signals received by the database may represent indications of detected faults specific to LRUs, indications of invalid communication between LRUs, various system configuration or state indications, and other supporting data allowing efficient fault isolation.

The process 500 then receives a fault processing function call initiating execution of each of the set of logical rules, according to the order of execution (step 506). After receiving the fault processing function call (step 506), the process 500 accesses the one or more logic entities to retrieve and execute the set of logical rules, according to the order of execution, in response (step 508). The function call may include any type of executable instruction that initiates execution of each of the logical rules stored in the logic entities, according to the execution order stored in the logic entities. The function call is generally stored and executed in a manner external to operation of the process 500. The process 500 then accesses the one or more variable entities to retrieve the at least one defined variable associated with the set of logical rules, during execution of the set of logical rules (step 510). The defined variables provide additional data used during execution of the set of logical rules, which has been customized for a particular complex system. Once executed, the set of logical rules utilizes defined variables stored in the variable entities to produce output.

Next, the process 500 generates results from the executed set of logical rules, using the retrieved at least one defined variable (step 512). The process 500 then provides output based on the generated results, according to the configuration stored in the I/O entities (step 514). Results generated from the executed set of logical rules may include fault reports, maintenance memos, or another form of communication of fault processing data. This fault processing data is transmitted by the process 500 using a communication protocol applicable to the complex system. Data detailing the appropriate communication protocol is also stored in, and retrieved from, the I/O entities. Here, the configuration of one or more external interfaces stored in the I/O entities directs the produced output to the correct location, in the correct format and according to the applicable communication protocol for the complex system.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium," "computer-readable medium," or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for operation of a reusable fault processing database in conjunction with a complex system, the method comprising:
   storing a set of logical rules into one or more logic entities of the reusable fault processing database, the set comprising one or more executable instructions applicable to fault detection and fault isolation in the complex system;
   storing at least one defined variable for each of the received set of logical rules, the at least one defined variable being stored into one or more variable entities of the reusable fault processing database, wherein the at least one defined variable comprises an input signal or an output signal of the one or more logic entities representing the set of logical rules, and wherein the at least one defined variable is used to calculate a state of each of the one or more logic entities;
   storing a configuration of at least one external interface of the reusable fault processing database, the configuration comprising a communication protocol applicable to the complex system and the configuration being stored in one or more input/output (I/O) entities of the reusable fault processing database, the external interface comprising a communication connection compatible with the communication protocol, the external interface further comprising a defined set of input to the reusable fault processing database and a defined set of output from the reusable fault processing database, wherein the defined set of input comprises communication signals indicating an existence and a location of a fault in the complex system, wherein the defined set of output comprise a fault report including fault detection data and fault isolation data for the complex system, and wherein the configuration of the external interface defines:
   units of a complex system from which the defined set of input is received; and
   form and content of results generated by execution of the set of logical rules;
   executing each of the set of logical rules, in response to a received function call, to generate the results; and
   identifying the location of the fault in the complex system, based on the results.

2. The method of claim 1, further comprising:
   storing an order of execution for the set of logical rules into the one or more logic entities of the reusable fault processing database, the order of execution comprising a fixed execution sequence for each of the executable instructions;
   wherein the received function call initiates execution of the set of logical rules according to the order of execution, utilizing the at least one variable and the external interface.

3. The method of claim 2, further comprising:
   storing a second set of logical rules and a second order of execution into the one or more logic entities of the reusable fault processing database, wherein storing the second set of logical rules overwrites the set of logical rules, and wherein storing the second order of execution overwrites the order of execution;
   storing a second at least one variable into the one or more variable entities of the reusable fault processing database, wherein storing the second at least one variable overwrites the at least one variable;
   storing a second configuration of the at least one external interface into the one or more I/O entities of the reusable fault processing database, wherein storing the second configuration overwrites the configuration; and
   executing each of the second set of logical rules according to the second order of execution, in response to the received function call, utilizing the second at least one variable and the second external interface.

4. The method of claim 1, wherein each of the received set of logical rules is selected from the group consisting of a truth table and a latch.

5. The method of claim 1, wherein storing the set of logical rules into one or more logic entities further comprises storing a subset of the set of logical rules into one or more logic sub-entities; and
wherein one of the one or more logic entities comprises the one or more logic sub-entities.

6. The method of claim 5, wherein the one of the one or more logic entities comprises a truth table; and
wherein each of the one or more logic sub-entities comprises a truth vector.

7. A reusable fault processing system, comprising:
a fault processing module, configured to initiate execution of a set of reconfigurable logical rules associated with fault detection and fault isolation in a complex system; and
a fault detection database module, configured to provide a framework for customization and use of the reusable fault processing system, the fault detection database module comprising:
a plurality of logic entities, configured to store the set of reconfigurable logical rules;
a plurality of variable entities, configured to store definitions for a plurality of variables for use by the at least one logic entity, wherein the plurality of variables comprises an input signal or an output signal of the at least one logic entity representing the set of reconfigurable logical rules, and wherein the plurality of variables is used to calculate a state of each of the at least one logic entity; and
at least one input/output (I/O) entity, configured to store a configuration for an external interface comprising at least one communication connection within the complex system and external to the fault detection database module, wherein the configuration comprises a communication protocol applicable to the complex system wherein the external interface further comprises a defined set of input to the reusable fault processing database and a defined set of output from the reusable fault processing database, wherein the defined set of input comprises communication signals indicating an existence and a location of a fault in the complex system, wherein the defined set of output comprises a fault report including fault detection data and fault isolation data for the complex system, and wherein the configuration of the external interface defines:
units of the complex system from which the defines set of input is received; and
form and content of results generated by execution of the set of logical rules;
wherein the fault processing module is further configured to execute each of the set of reconfigurable logical rules, in response to a received function call, to generate the results, and identify the location of the fault in the complex system, based on the results.

8. The reusable database structure of claim 7, further comprising:
a developer interface, configured to receive user input for creating and modifying the set of reconfigurable logical rules, the plurality of variables, and the at least one connection;
wherein receiving the user input at the developer interface does not alter a current configuration of the complex system.

9. The reusable database structure of claim 8, wherein the developer interface is further configured to receive second user input for modifying and executing instructions associated with the fault processing module; and
wherein receiving the second user input at the developer interface does not alter a current configuration of the fault detection database module.

10. The reusable database structure of claim 7, further comprising:
a developer interface, configured to receive user input defining the set of reconfigurable logical rules;
wherein each definition for the set of reconfigurable logical rules is selected from the group consisting of a truth table and a latch.

11. The reusable database structure of claim 7, wherein one of the plurality of logic entities comprises a plurality of logic sub-entities; and
wherein the one of the plurality of logic entities stores a truth table, and wherein the plurality of logic sub-entities stores a plurality of truth vectors.

12. The reusable database structure of claim 7, wherein the plurality of logic entities is further configured to store an execution order;
wherein the execution order comprises a sequence for execution of each of the set of reconfigurable logical rules; and
wherein the fault processing module is further configured to execute the set of reconfigurable logical rules according to the execution order.

13. The reusable database structure of claim 7, wherein the developer interface is configured to receive user input indicating one of the definitions for the plurality of variables comprises a signal originating outside of the reusable database structure.

14. The reusable database structure of claim 7, wherein the developer interface is configured to receive user input indicating one of the definitions for the plurality of variables comprises an output of a first one of the set of logical rules and an input of a second one of the set of logical rules.

15. The reusable database structure of claim 7, wherein the definition for the at least one connection comprises a table applicable for use with a plurality of communication protocols.

16. A computer-based fault processing system comprising a non-transitory, computer-readable medium containing instructions thereon, which, when executed by a processor, perform a method comprising:
defining a reusable fault processing database structure comprising:
a first framework for a set of executable logical rules, the set of executable logical rules configured for execution by the computer-based fault processing system, the set of executable logical rules configured to detect and isolate a fault in a complex system of line-replaceable units (LRUs);
a second framework for a plurality of variables, the plurality of variables configured to:
specify one or more input values to each of the set of executable logical rules; and
specify one or more output values from each of the set of executable logical rules; and
a third framework comprising a configuration for an external interface, the external interface configured to define at least one communication connection between the reusable database structure and the complex system, wherein the configuration comprises a communication protocol applicable to the complex system, wherein the external interface further comprises a defined set of input to the reusable fault processing database structure and a defined set of output from the reusable fault processing database structure, wherein the defined set of input comprises communication signals indicating an existence and a location of a fault in the complex system, wherein the one or more output values comprises a fault report including fault detection data and fault isolation data for the complex system, and wherein the configuration of the external interface defines:
 units of the complex system from the one or more input values are received; and
 form and content of results generated by execution of the set of logical rules;
executing each of the set of executable logical rules, in response to a received function call, to generate the results; and
identifying the location of the fault in the complex system, based on the results.

17. The reusable database structure of claim 16, wherein the first framework further comprises an execution sequence for the set of executable logical rules.

\* \* \* \* \*

UNITED STATES PATENT AND TRADEMARK OFFICE
CERTIFICATE OF CORRECTION

PATENT NO. : 9,524,204 B2
APPLICATION NO. : 14/506347
DATED : December 20, 2016
INVENTOR(S) : Martin Talafa Page 1 of 1

It is certified that error appears in the above-identified patent and that said Letters Patent is hereby corrected as shown below:

In the Claims
Column 15, Line 8, "comprises" should be changed to --comprise--;
Column 15, Line 12, after "from" insert --which--.

Signed and Sealed this
Sixth Day of June, 2017

Michelle K. Lee
*Director of the United States Patent and Trademark Office*